United States Patent Office 3,300,078
Patented Jan. 24, 1967

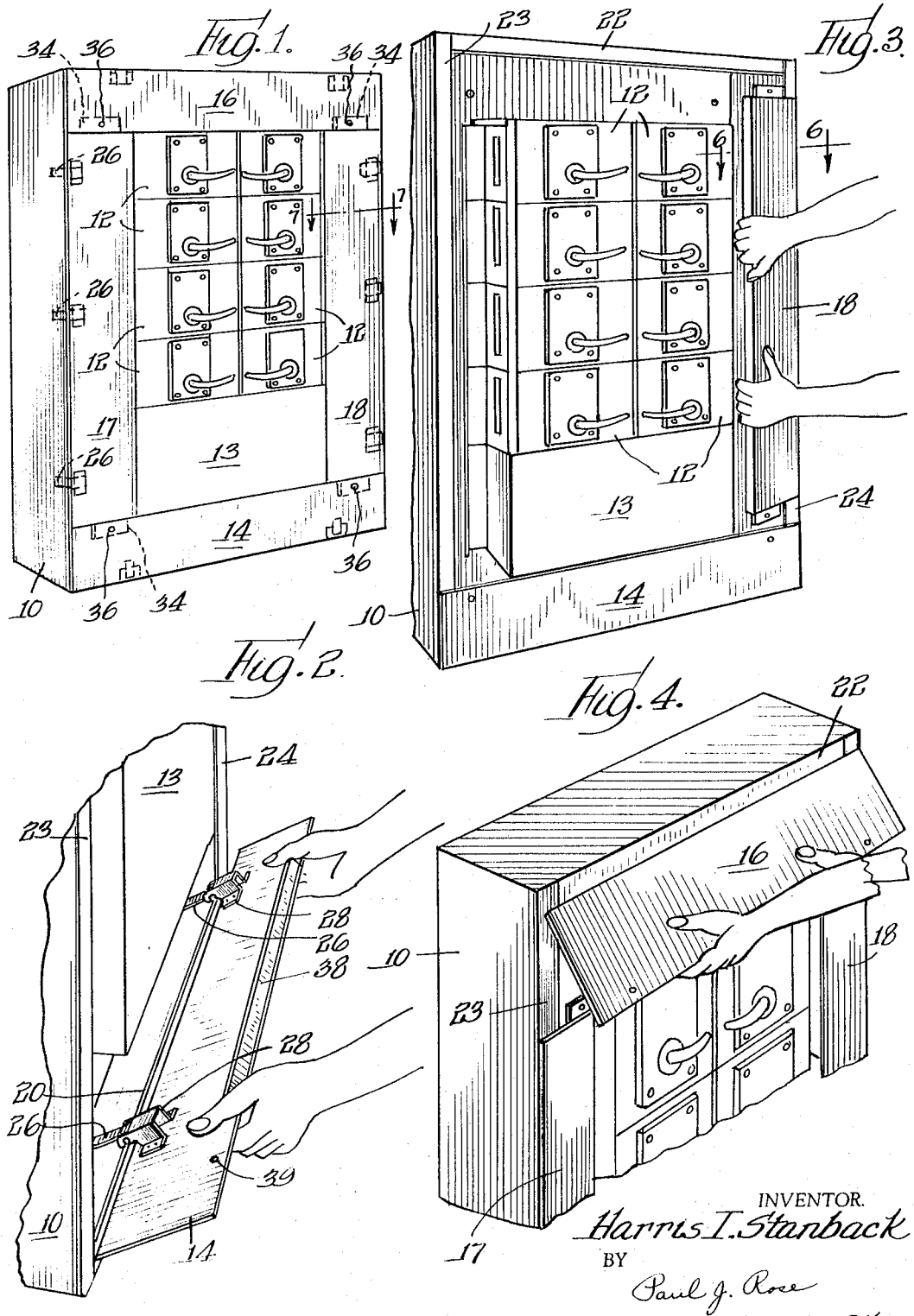

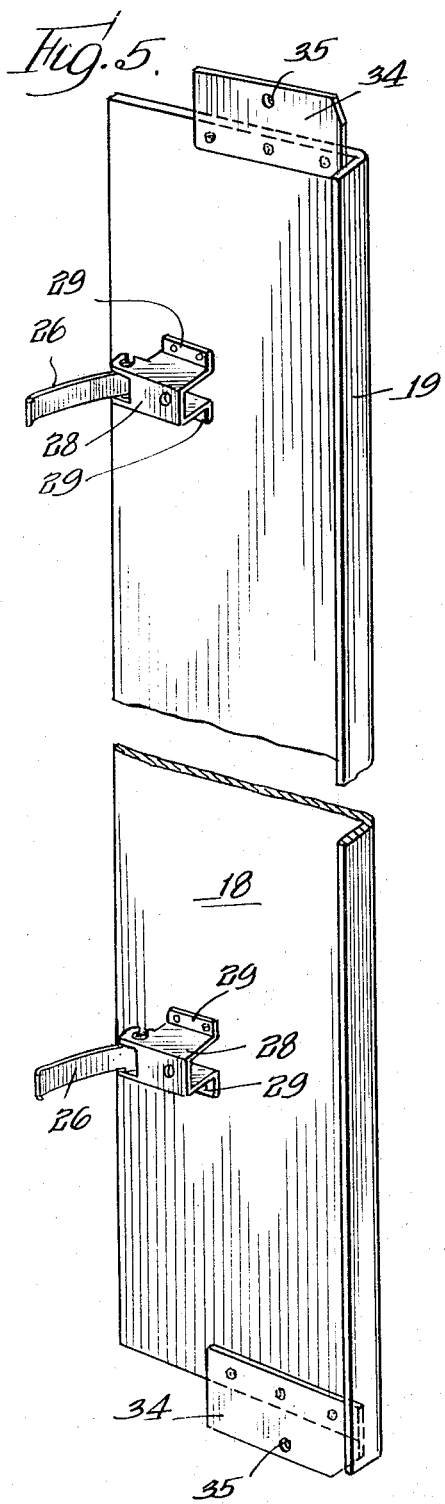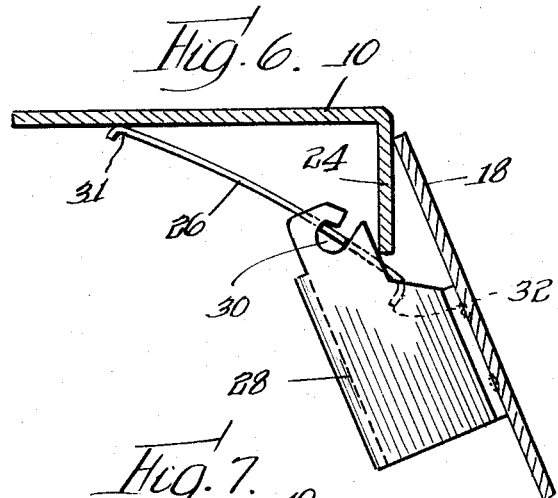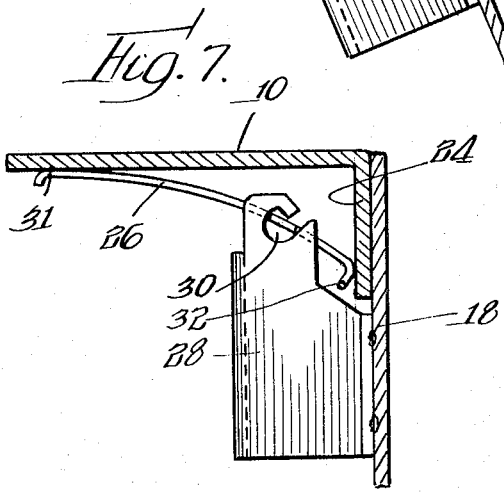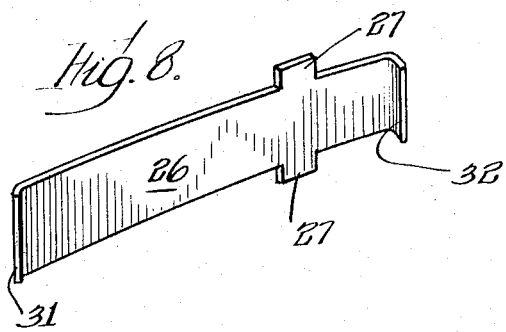

3,300,078
ENCLOSURE FOR ELECTRICAL PANELBOARDS AND THE LIKE
Harris I. Stanback, Lexington, Ky., assignor to Square D Company, Park Ridge, Ill., a corporation of Michigan
Filed Sept. 5, 1963, Ser. No. 306,890
6 Claims. (Cl. 220—4)

This invention relates generally to front trim structure for the open-front boxes of large electrical panelboards having switches, circuit breakers, or motor starters mounted thereon, and more particularly to an improved means of securing a front trim panel to an inwardly extending front flange on a wall of such a box.

One former way of securing a four-piece front trim to a box was to secure each piece in place by screws threaded into a flange on the box. Three or four screws were used on each piece and the assembly was time-consuming and costly.

An object of the invention is to provide an improved means of securing a front trim panel to an inwardly extending front flange on a wall of an open-front box for electrical control equipment.

Another object is to provide an improved means of securing a four-piece front trim to the box of an electrical panelboard.

Still another object is to provide a four-piece front trim for the box of an electrical panelboard, the front trim being neater in appearance than those formerly used.

A further object is to provide a four-piece front trim which can be installed on a box much faster than former front trims.

A still further object is to provide an electrical panelboard which has an open-front box and inwardly extending front flanges respectively on the top, bottom, and opposite sides of the box with an improved four-piece front trim, the trim including a top panel, a bottom panel, and a pair of side panels clamped respectively to the front flanges on the box by generally flat elongated resilient spring clamps, each of the panels having at least one of the spring clamps pivotally mounted thereon, one end of each clamp engaging the inner surface of a wall of the box and the other end engaging the inner surface of one of the flanges, and each of the panels being secured adjacent opposite ends respectively to end portions of two other panels.

Other objects and advantages will appear when the following specification is considered along with the accompanying drawings in which:

FIGURE 1 is a perspective view of a panelboard or switchboard having a four-piece front trim constructed in accordance with the invention mounted on the box thereof;

FIGURE 2 is a fragmentary perspective view of the panelboard of FIGURE 1 showing the installation of the bottom panel of the four-piece front trim;

FIGURE 3 is a perspective view of the panelboard of FIGURE 1 showing the installation of a side panel of the four-piece front trim;

FIGURE 4 is a fragmentary perspective view of the panelboard of FIGURE 1 showing the installation of the top panel of the four-piece front trim;

FIGURE 5 is a perspective view of one of the side panels of the four-piece front trim, with a central portion broken away;

FIGURE 6 is a fragmentary sectional view taken along the line 6—6 of FIGURE 3 and showing one of the spring clamps on the side panel in an unstressed condition;

FIGURE 7 is a fragmentary sectional view taken along the line 7—7 of FIGURE 1 and showing one of the spring clamps on the side panel in stressed condition clamping the side panel to the box flange; and FIGURE 8 is a perspective view of a spring a clamp before it is assembled.

FIGURE 1 shows a panelboard including an open-front box 10 having a plurality of electrical control devices or switches 12 and a blank spacer 13 mounted therein and a four-piece front trim constructed in accordance with the invention mounted thereon. The four-piece front trim includes a bottom panel 14, a top panel 16, and a pair of side panels 17 and 18. Each side panel has a flange, such as the flange 19 shown on the panel 18 in FIGURE 5, to provide the panel with greater strength and rigidity. The side panel 17 is preferably identical to the side panel 18, and the bottom panel 14 is preferably identical to the top panel 16.

For strength, rigidity, and to provide front trim mounting means, the bottom, top, and opposite sides of the box 10 are provided with inwardly extending front flanges 20, 22, 23, and 24, respectively, as shown in FIGURES 2, 3 and 4.

FIGURE 5 shows the side panel 18 from the rear. Clamping members, preferably two or more, are provided at spaced locations on the outer edge portion of the side panel 18 which is intended to overlap the flange 24 of the box 10. Preferably the clamping members are in the form of generally flat, elongated, resilient spring clamps 26 made of spring steel. Alternatively, the clamping members may be rigid members backed by springs. The spring clamps 26 are respectively pivotally mounted in generally U-shaped brackets 28 having opposed flange portions 29 spot welded or otherwise secured to the inner surface of the side panel 18.

The pivotal mounting of each spring clamp 26 includes a pair of transversely projecting tongue portions 27 best shown in FIGURE 8. The tongue portions 27 are received in open-ended slots 30 (FIGURES 6 and 7) provided in opposed leg portions of the brackets 28 and enlarged at their inner ends. Opposite end portions 31 and 32 of each spring clamp 26 are rounded for sliding engagement with the box 10 during assembly of the side panel 18 thereto. The end portion 32 of each spring clamp engages the side panel 18 before the tongue portions 27 can be turned enough to be released from the slots 30, and thus the tongue portions may be trapped in the slots when the brackets 28 are welded to the side panel 18.

FIGURE 6 shows an initial position of the side panel 18 relative to the box 10 during assembly thereto, the spring clamp 26 being unstressed and only slightly curved. FIGURE 7 shows the side panel 18 in assembled position on the box 10 and clamped to the flange 24 thereof by the rounded end portion 32. The clamping pressure is increased as the bracket 28 is moved toward the side of the box 10 and the end portion 31 of the spring clamp engages the inner surface of the side wall of the box and causes the spring clamp to be stressed to a more curved shape from that shown in FIGURE 6 to that shown in FIGURE 7. The flange 19 is located inwardly of the side wall of the box 10 and adjacent the right hand row of switches 12 when the side panel 18 is mounted on the box as shown in FIGURE 1.

A pair of anchoring plates 34 are spot welded or otherwise secured respectively to the top and bottom portions of the inner surface of the side panel 18 and extend beyond respective upper and lower edges thereof, as shown in FIGURE 5. Each plate 34 has a hole 35 for threadedly receiving an anchoring screw 36 (FIGURE 1).

As mentioned above, the side panel 17 may be identical to the side panel 18.

The bottom panel 14 is also provided with spring clamps 26, preferably two or more, mounted respectively in brackets 28 (FIGURE 2). A flange 38 is provided on the panel 14 opposite the clamps 26. The flange 38 is substantially as long as the width of the spacer 13 and terminates at opposite ends short of the full length of the bottom panel in order to clear the lower anchoring plates 34 on the side panels 17 and 18. The flange 38 may be formed integrally with the bottom panel, but is preferably an angle bracket welded thereto. The bottom panel is provided with a pair of holes 39 for respectively receiving two of the anchoring screws 36, which are threadedly received in the lower anchoring plates 34.

As mentioned above, the top panel 16 may be identical to the bottom panel 14.

To install the four panels 14, 16, 17, and 18 on the box 10, the bottom panel 14 is applied first, as shown in FIGURE 2, being clamped to the flange 20 of the box by the spring clamps 26, in the manner shown in FIGURES 6 and 7 for the side panel 18. The side panels 17 and 18 are similarly applied and clamped respectively on the flanges 23 and 24 and then moved downwardly thereon to position the lower anchoring plates 34 thereof behind the bottom panel 14, and then the top panel 16 is installed on the flange 22. Finally, the four screws 36 are inserted through the holes 39 in the bottom and top panels 14 and 16 and threaded into the anchoring plates 34 on the side panels 17 and 18. Thus, the entire operation consists merely in slipping the respective spring clamps 26 of the four panels over the four flanges of the box and inserting the four screws 36. It will be noted that the screws 36 do not secure the panels directly to the box or to any bracket mounted on the box, but rather they merely secure the panels to each other, and the panels are held on the flanges of the box solely by the spring clamps 26.

To remove the panels from the box, the screws 36 are first removed and then the top panel 16, side panels 17 and 18, and bottom panel 14 are removed in that order. It will be noted that the panels can be removed separately, but that it is impossible to remove all four of them together, it being necessary to first disconnect them by removing the screws 36.

Various modifications may be made in the structure shown and described without departing from the spirit and scope of the invention.

I claim:

1. An enclosure for electrical panelboards and the like, said enclosure comprising an open-front box having a rear wall portion, a pair of opposed wall portions extending generally perpendicularly to said rear wall portion, and a front flange on one of said opposed wall portions, said flange being generally parallel to said rear wall portion and extending from a front edge portion of said one of said opposed wall portions toward the other of said opposed wall portions, and a self-clamping front trim panel removably securable to said flange merely by the placing of said front trim panel in assembled relationship with said flange, said front trim panel including a generally flat panel member, a bracket fixedly secured to an inner surface of said panel member, and an elongated resiliently deformable clamping strip member pivotally mounted between opposite ends thereof in said bracket, the placing of said front trim panel in assembled relationship with said flange resiliently deforming said clamping strip member and positioning a portion of said inner surface of said panel member in engagement with an outer surface of said flange, and one end portion of said clamping strip member bearing against an inner surface of said one of said opposed wall portions and the other end portion of said clamping strip member bearing against an inner surface of said flange when said front trim panel and flange are in assembled relationship, whereby said flange is clamped between said other end portion of said clamping strip member and said panel member.

2. An enclosure for electrical panelboards and the like, said enclosure comprising an open-front box having a rear wall portion and a pair of opposed wall portions extending generally perpendicularly to said rear wall portion, each of said opposed wall portions having a front flange extending from a front edge portion thereof in a direction generally parallel to said rear wall portion and toward the other of said opposed wall portions, and a pair of self-clamping front trim panels removably securable respectively to the flanges of said opposed wall portions merely by the placing of said front trim panels in assembled relationship respectvieIy with said flanges, each of said front trim panels including a generally flat panel member, a bracket, and an elongated resiliently deformable clamping strip member, the bracket of each front trim panel being fixedly secured to an inner surface of the panel member of the front trim panel and the clamping strip member of each front trim panel being pivotably mounted between its opposite ends in the bracket of the front trim panel, the placing of each of said front trim panels in assembled relationship with the respective one of said flanges resiliently deforming its clamping strip member and positioning a portion of the inner surface of its panel member in engagement with an outer surface of the respective flange, and one end portion of the clamping strip member of each of said front trim panels bearing against an inner surface of a respective one of said opposed wall portions and the other end portion of the clamping strip member of each of said front trim panels bearing against an inner surface of the respectvie one of said flanges when said front trim panels and flanges are respectively in assembled relationship, whereby each of said flanges is clamped between said other end portion of the respective clamping strip member and the respective panel member.

3. An enclosure for electrical panelboards and the like, said enclosure comprising an open-front box having a rear wall portion, a pair of opposed generally parallel top and bottom wall portions extending generally perpendicularly to said rear wall portion, and a pair of opposed generally parallel side wall portions extending generally perpendicularly to said rear wall portion and to said top and bottom wall portions, each of said top and bottom wall portions having a front flange extending from a front edge portion thereof in a direction generally parallel to said rear wall portion and toward the other of said top and bottom wall portions and each of said side wall portions having a front flange extending from a front edge portion thereof in a direction generally parallel to said rear wall portion and toward the other of said side wall portions, and four self-clamping front trim panels removably securable respectively to the flanges of said top, bottom, and side wall portions merely by the placing of said front trim panels in assembled relationship respectively with said flanges, each of said front trim panels including a generally flat panel member, a bracket, and an elongated resiliently deformable clamping strip member, the bracket of each front trim panel being fixedly secured to an inner surface of the panel member of the front trim panel and the clamping strip member of each front trim panel being pivotably mounted between its opposite ends in the bracket of the front trim panel, the placing of each of said front trim panels in assembled relationship with the respective one of said flanges resiliently deforming its clamping strip member and positioning a portion of the inner surface of its panel member in engagement with an outer surface of the respectvie flange, and one end portion of the clamping strip member of each of said front trim panels bearing against an inner surface of a respective one of said top, bottom, and side wall portions and the other end portion of the clamping strip member of each of said front trim panels bearing against an inner surface of the respective one of said flanges when said front trim panels and flanges are respectively in assembled relationship, whereby each of said flanges is clamped between said other end portion of the respective clamping strip member and the respective panel member.

4. An enclosure as claimed in claim 3, including means securing opposite end portions of each of the panel members of said front trim panels respectively to end portions of the panel members of two other front trim panels.

5. Fastening means for securing a front trim panel to an inwardly extending front flange on a wall of an open-front box, said fastening means comprising a mounting bracket fixedly secured to an inner surface of said panel and an elongated resiliently deformable clamping strip member pivotally mounted on said mounting bracket and having a pair of opposite end portions, said clamping strip member being resiliently deformed and one of said end portions being engaged with the inner surface of said wall from which said flange extends and said flange being clamped between the other of said end portions and said panel when said panel is assembled with said flange.

6. A fastening means as claimed in claim 5, wherein said opposite end portions of said clamping strip member are rounded for sliding engagement respectively with said wall and with said flange thereof during application of said panel to said flange.

References Cited by the Examiner

UNITED STATES PATENTS

| | | | |
|---|---|---|---|
| 1,165,894 | 12/1915 | Negraval. | |
| 1,642,698 | 9/1927 | Rohn | 317—119 |
| 2,103,069 | 12/1937 | Frank | 317—119 |
| 3,105,173 | 9/1963 | Kingdom | 317—119 |

THERON E. CONDON, *Primary Examiner.*

GEORGE E. LOWRANCE, *Examiner.*